W. R. GREEN.
EXTRA TIRE CARRIER.
APPLICATION FILED AUG. 28, 1917.
1,329,174.
Patented Jan. 27, 1920.
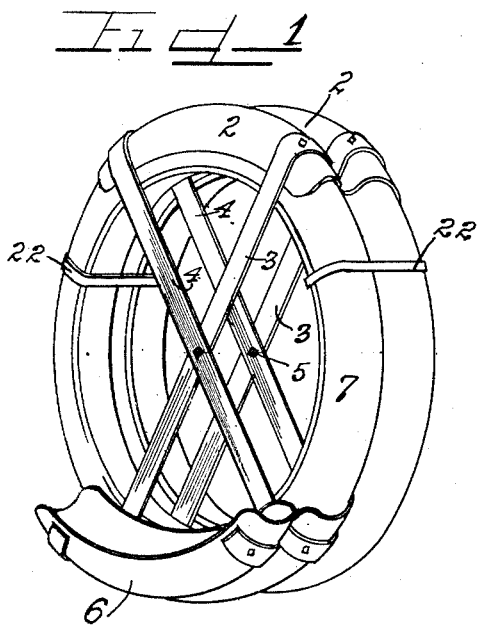
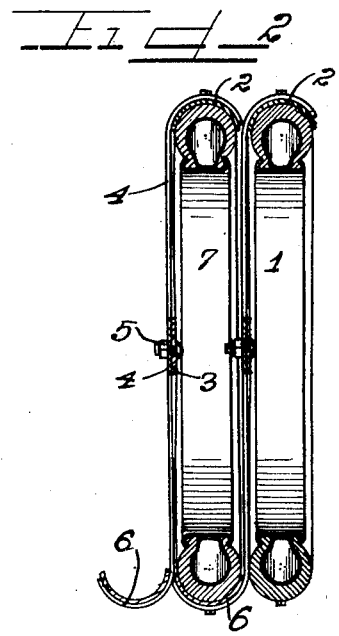
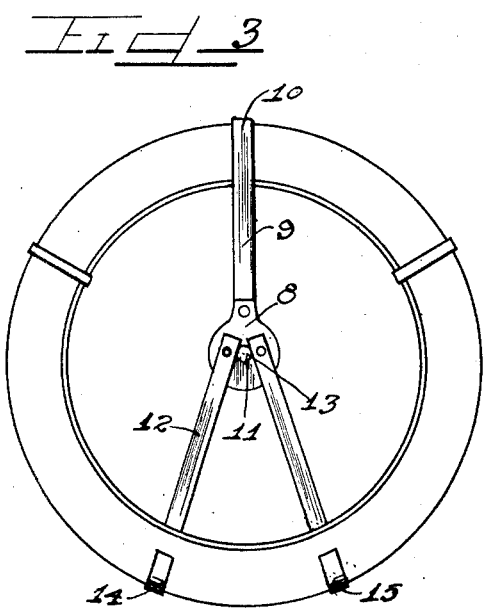
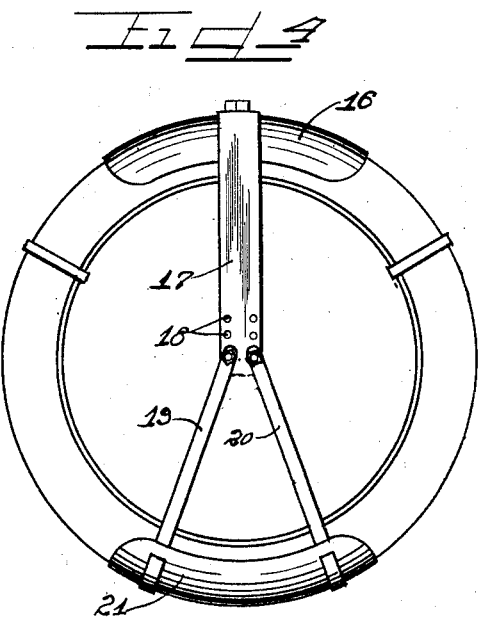
Witnesses
C. F. Peterson
Inventor
Walter R. Green
by Atty.

UNITED STATES PATENT OFFICE.

WALTER R. GREEN, OF CHICAGO, ILLINOIS.

EXTRA-TIRE CARRIER.

1,329,174.    Specification of Letters Patent.    Patented Jan. 27, 1920.

Application filed August 28, 1917. Serial No. 188,554.

*To all whom it may concern:*

Be it known that I, WALTER R. GREEN, a citizen of the United States, and a resident of the city of Chicago, in the county of Cook and State of Illinois, have invented certain new and useful Improvements in Extra-Tire Carriers; and I do hereby declare that the following is a full, clear, and exact description of the same, reference being had to the accompanying drawings, and to the numerals of reference marked thereon, which form a part of this specification.

This invention relates to improvements in "extra tire carriers."

Heretofore when it was desired to carry several extra tires, it has been necessary to carry them at different inconvenient places on the car or to tie or strap them to the extra casing which was held in the tire carrier provided for that purpose by the manufacturer. Considerable annoyance and inconvenience has been occasioned as well as loss from the partial destruction of the casings where the same are fastened to different parts of the machine.

It is an object of this invention to provide an extra tire support or carrier adapted to be used in conjunction with the stationary carrier provided with the machine regardless of the position whereof whether on the running board, back of the machine or any other place, to support a tire whereby as many tires as desired may be carried.

It is further an object of this invention to provide an extra tire carrier which may be quickly attached for use and as quickly detached and which may be folded or collapsed to occupy small space when not in use.

It is further an object of this invention to provide an adjustable tire carrier adapted to receive and support tires of different sizes therein.

Other and further important objects of the invention will be evident from the disclosure in the drawings and specification.

The invention (in a preferred form) is illustrated in the drawings and hereinafter more fully described.

On the drawings:

Figure 1 is a perspective view of a tire carrier embodying my invention showing a plurality thereof in use.

Fig. 2 is a central vertical section of Fig. 1.

Fig. 3 illustrates a modified form of adjustable support.

Fig. 4 illustrates another modified form of adjustable support.

As shown in the drawings:

1, illustrates a casing which is supported by the stationary carrier (not shown) which is usually supplied by the manufacturers.

The support or carrier is adapted to be supported by the tire and comprises a channel member or plate 2, of suitable curvature and shape to fit over the tire. Rigidly secured thereto are straps of metal 3—4 which are crossed at approximately their central portion and rigidly secured together by rivets or bolts 5. The lower ends of the bars 4—5 have rigidly secured thereto a channel supporting member or plate 6 which is complemental with the channel member 2, but faces oppositely. By this construction, the device is universal in application and either member is adapted to engage over the casing 1 or to receive an additional tire 7, therein.

In the construction shown in Fig. 3, a plate or member 8 is provided to which is pivoted an arm 9, having its end 10, shaped to engage over a casing. A stop lug or indent 11 is struck from said plate 8 on each side of which supporting arms 12—13 are pivoted to the plate at their inner ends and their outer ends 14—15 are shaped to support a casing therein.

In the construction shown in Fig. 4, an annular member 16, similar to members 2—6, is provided to which is fastened a supporting bracket or bar 17, provided with rows of apertures 18, at the lower end thereof. A pair of arms or bars 19—20, are pivotally and adjustably secured to the depending bracket 17, by means of bolts adapted to engage in any of the apertures. Secured to the lower ends of the arms or bars 19—20, is an annular supporting member 21, such as before described or of any suitable shape.

The operation is as follows:

To carry an extra tire, it is only necessary to place one of the channel members 2—10—16 over the tire or casing in the stationary support and place the extra casing in the other channel member after which the tires may be strapped together by means of straps 22. If desired to carry a third extra casing it is simply necessary to attach another tire carrier and place the casing therein and strap the three together, which operation may be continued until the desired number of extra casings are secured to the machine.

With my casing support it is immaterial whether the stationary tire carrier is at the rear of the machine, or the running board.

The device shown in Fig. 3 is adapted for carrying tires of various diameters by simply spreading the arms 12—13 toward or away from each other until the desired adjustment is attained. It is obvious arm 9, may be folded to provide a compact device when not in use.

The construction shown in Fig. 4, supports the casing as before described and is adjustable to support tires of varying sizes by manipulating the bolts to engage in different apertures in the bracket or bar 17. This device may be collapsed by removing one bolt and swinging the arms 17—19—20 together.

Many details of construction may be varied and numerous changes may be made without departing from the principles of my invention. I therefore do not desire to limit this application for patent otherwise than necessitated by the prior art but desire to claim the device broadly.

I claim as my invention:

1. A tire carrier of the class described for coöperation with a supported tire comprising curved means to fit over the upper portion of said supported tire on the upper tread surface thereof, diagonal braces depending from said means and another similarly curved means supported on the ends of said braces, and projecting outwardly from and lying against the lower portion of said tire to receive another tire seated therein.

2. A tire carrier for use in combination with a supported tire to carry an auxiliary tire comprising means adapted to fit around the upper portion of the tread of the supported tire, diagonal braces attached to and depending therefrom and a secondary curved supporting means attached to said diagonal braces and resting against the lower portion of said supported tire adapted to receive the auxiliary tire seated therein substantially concentric with the said supported tire and resting against the upper portion of said secondary means.

3. An auxiliary tire carrier device comprising means curved to fit around the upper tread portion of a supported tire, a similarly curved element to receive another tire seated therein and adjustable connecting mechanism between said element and means whereby said element is supported below said means and resting against the supported tire, displaced outwardly therefrom and directed upwardly to receive an extra tire seated therein in concentric relation to said supported tire.

4. In a device of the class described, a member adapted to fit and be supported on the tread of a supporting tire and members depending therefrom and adjustably connected therewith to engage under the tread of a supported tire.

5. In a device of the class described, an annular member adapted to engage over the tread of a supporting tire, a depending bar secured thereto, arms adjustably connected to said bar and an annual member secured to the lower ends of the bars and adapted to engage under the tread of the supported tire.

In testimony whereof I have hereunto subscribed my name in the presence of two subscribing witnesses.

WALTER R. GREEN.

Witnesses:
CHARLES W. HILLS, Jr.,
EARL M. HARDINE.